Sept. 15, 1942.　　　　M. ZAIGER　　　　2,295,620
ARM FOR WINDSHIELD WIPERS
Filed May 7, 1941　　　　2 Sheets-Sheet 2
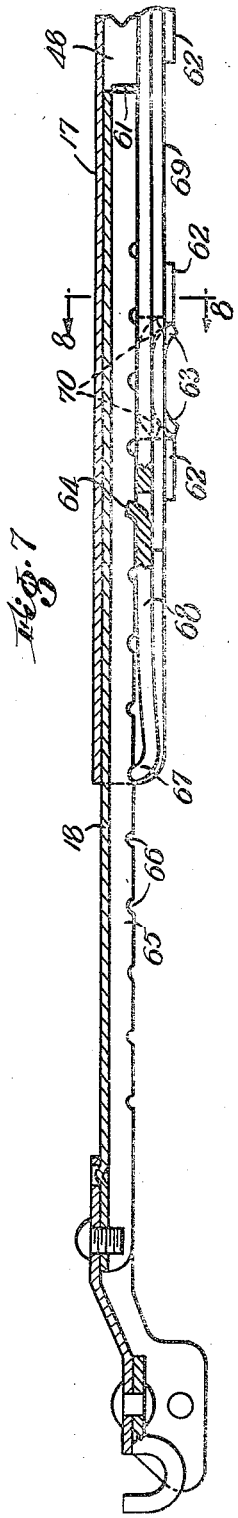
Inventor
Max Zaiger
by Thomson & Thomson
his Attys Patented Sept. 15, 1942

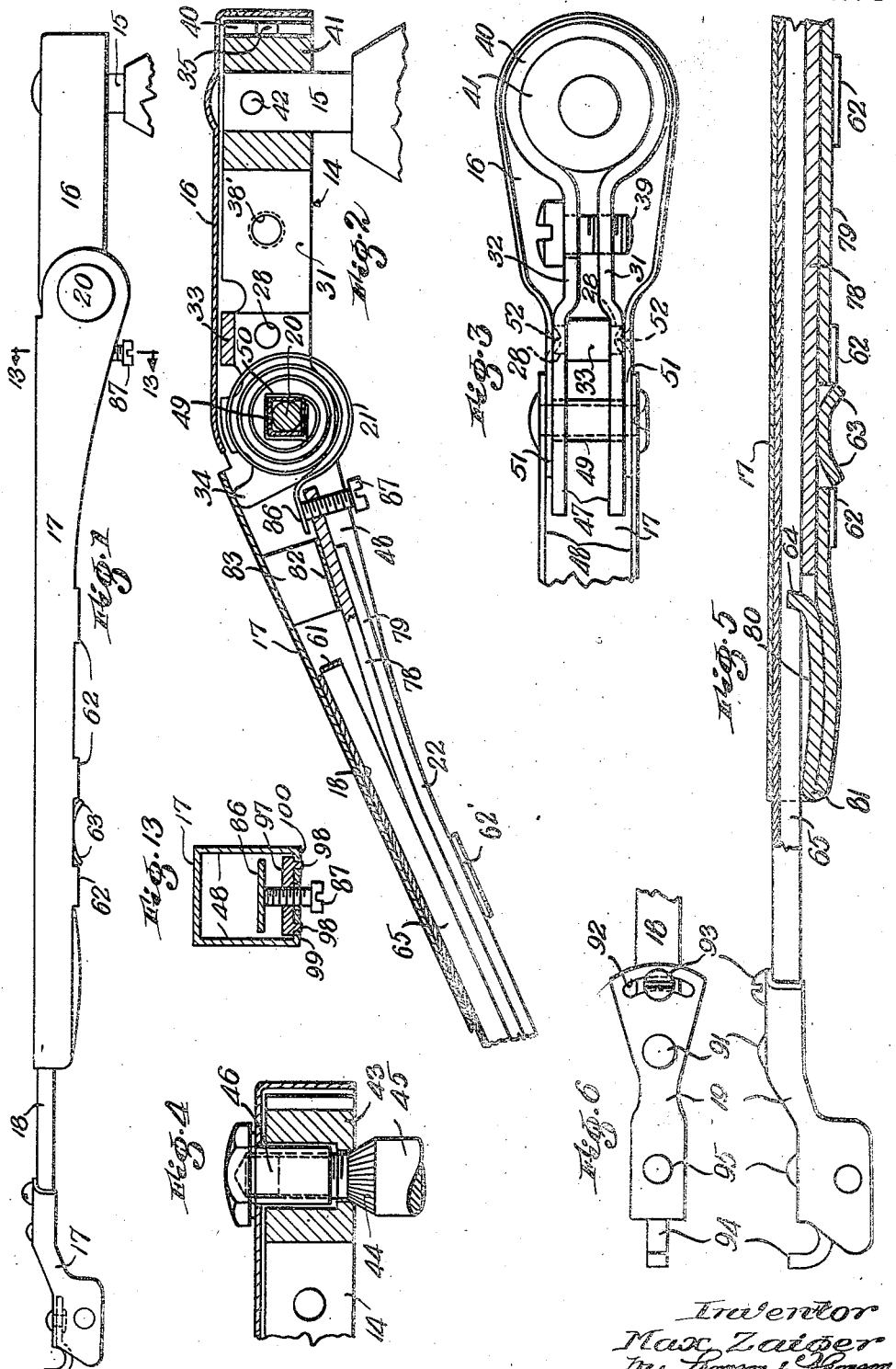

2,295,620

UNITED STATES PATENT OFFICE 2,295,620

ARM FOR WINDSHIELD WIPERS

Max Zaiger, Swampscott, Mass.

Application May 7, 1941, Serial No. 392,269

10 Claims. (Cl. 15—255)

This invention relates to arms for windshield wipers, and this application is a continuation in part of my copending application Serial No. 349,139, filed August 1, 1940.

The principal purpose of the present invention is to provide an articulated wiper arm equipped with improved spring means associated with the pivotal connection between its inner and outer sections and adapted to urge the outer section toward operative position against the windshield.

Another object is to provide an articulated wiper arm having a slidable bar for adjusting the effective length of the arm, and equipped with improved means for yieldingly maintaining the slidable bar in adjusted position and for yieldingly pressing the free end of said bar toward the windshield.

Further objects of the invention reside in the improved structural features of the recommended embodiments of the invention shown in the accompanying drawings, as hereinafter described and pointed out in the appended claims; but it will be understood that the structural details of the devices herein disclosed may be varied to suit particular conditions without departing from the essence of the invention as set forth in said claims.

In the drawings,

Fig. 1 is a side view of a preferred form of the improved wiper arm, as attached to the shaft end of a conventional wiper motor;

Fig. 2 is an enlarged longitudinal section of the arm shown in Fig. 1, the end portions of the arm being broken away;

Fig. 3 is a bottom view of the upper end of the arm, illustrating the articulated connection of its two sections, the spring member shown in Fig. 2 being omitted;

Fig. 4 is a fragmentary section of the inner end of the arm, illustrating a modified form of connection to the motor shaft;

Fig. 5 is an enlarged fragmentary side view partly in longitudinal section, of the free end portion of the outer arm section shown in Figs. 1 and 2;

Fig. 6 is a plan view of a pivoted terminal shown in Figs. 1 and 5;

Fig. 7 is a sectional view similar to Fig. 5 illustrating a further modification of the outer arm section;

Fig. 8 is a section on line 8—8 of Fig. 7;

Fig. 9 is a plan view of a blank from which the inner section of the arm of Figs. 1 to 3 is made;

Fig. 10 is a side elevation of said inner section, assembled for application to the motor shaft and outer section of the arm;

Fig. 11 is an end view of the inner section, looking to the left of Fig. 10;

Fig. 12 is a perspective view of a squared tube which is mounted on the pivot of the articulated sections and embraced by the end of a coiled spring, as shown in Fig. 2;

Fig. 13 is a section taken on line 13—13 of Fig. 1, but showing a modified arrangement for adjusting the tension of the clock spring shown in Fig. 2; and Fig. 14 is a fragmentary view similar to Fig. 2 but with the springs and sliding bar omitted and part of the inner section broken away, showing a further modification.

In the arrangement chosen for the purpose of illustration in Figs. 1 to 6, the improved wiper arm comprises an inner section 14 adapted to be mounted on the end 15 of a motor shaft, and normally enclosed by a channeled casing 16; a channeled outer section 17 preferably having a telescoping bar 18 provided with a pivoted terminal 19 to which a wiper blade may be removably connected; a round rivet 20 constituting the pivot for connecting the articulated sections and for hinging the cap or closure 16 at the pivotal connection; a clock spring 21 surrounding and fixed at one end to the pivot 20 and operatively engaging the outer section 17 so that the latter is normally urged toward operative position against the windshield; and a flat spring 22 retained by the side walls of the channeled section 17 and bearing against the sliding bar 18 frictionally to hold the latter in adjusted position while permitting free manual movement of the bar.

It will be understood that the terminal 19 is, as above indicated, adapted to carry a removable wiper blade of well-known construction and purpose, the blade being pressed against a windshield by the action of the spring 21 on the arm section 17 and being moved arcuately across the surface of the windshield upon reciprocation of the wiper arm by rotation of the motor shaft 15. The improved wiper arm may be mounted on any conventional type of motor shaft, and its telescoping bar may be connected to any usual type of wiper blade, either by the novel pivoted terminal 19 as herein shown and as described and claimed in my said copending application Serial No. 349,139, or by other forms of terminals suitable for attachment to the clip of a wiper blade.

In accordance with the present invention, the inner arm section 14 is preferably made from a blank of sheet metal as shown in Fig. 9, the blank having side portions 31 and 32 connected by a bridge 33, and terminating at one end of the blank in oppositely directed projections 34 which constitute stop members as hereinafter described. The opposite ends of the sides 31 and 32 are provided with complemental, interlocking tongue and slot portions 35 and 36 respectively; and the sides are provided with complemental openings including the square shaped holes 37, small openings or recesses 28, and screw holes 38 and 38', the latter being threaded to receive a clamping screw 39 (Fig. 3).

To form the inner section, the sides 31 and 32 are bent downwardly relative to the bridge 33, and the ends having the complemental tongue and slot connections are shaped to provide a round sleeve or bearing 40 when the tongue 35 is fitted to the slot 36, as shown in Figs. 10 and 11. This sleeve portion of the inner section 14 receives a tubular bushing 41 which fits over the motor shaft 15 (Figs. 2 and 3), and the bearing is clamped to the bushing by tightening the screw 39 in the threaded opening 38'. The bushing may be secured against rotation on shaft 15 by a locking pin 42 (Fig. 2) or by the optional arrangement of Fig. 4, where a centrally recessed bushing 43 is tightened against a serrated conical portion 44 of the motor shaft 45 by a skirted nut 46 fitting in the recess of the bushing and threading on the end of the shaft 45.

The spaced ends 47 of said inner section are embraced by the spaced sides 48 of the outer arm section 17, and the pivot pin or rivet 20 passes through the squared openings 37 of said end portions 47 and through complemental openings in said sides 48. The openings 37 are larger than the pivot, however, and a tube or sleeve 49 (Fig. 12) of square or other polygonal cross-section is fitted around the pivot 20 and has its squared ends engaged in the openings 37. The tube or sleeve 49 serves as an anchorage for the helical spring 21 which, as shown, has a squared inner end 59 snugly embracing the sleeve and soldered or otherwise secured thereto if desired. The spring end 50 is thus held in fixed relation to the inner arm section 14, regardless of the relative angular position of the outer section 17 as it rotates on pivot 20.

The channeled cap or cover 16 is also pivoted on the rivet 20 which passes through suitable openings in its spaced sides 51, the latter preferably being located between the sides 48 of the outer section and the spaced ends 47 of the inner section. Hence, the cover may swing outwardly away from the sleeve portion 40 to permit the mounting or dismounting of the inner section on the shaft 45; but the cover is preferably retained in closed position, as shown, by the snap engagement of inwardly pressed detents 52 within the openings or recesses 28 in the sides 31 and 32 of said inner section.

As previously indicated, the outer arm section 17 is channel-shaped and formed with spaced depending sides 48 between which slides the adjustable bar 18. The latter is also channel-shaped, and its inner end preferably has a cross-piece or abutment 61 which constitutes a limit stop to outward movement of the bar which slides between the sides 48. The bar is confined within the channel of section 17 and frictionally held in adjusted position by the flat spring member 22 which is preferably laminated to provide superposed leaves, either by folding the spring upon itself as shown in Figs. 2 and 5, or by using two separate spring members as shown in Figs. 7.

In either case, the spring is held between the sides 48 of section 17 and against the sliding bar by a series of clamping ears 62 bent inwardly from said sides; and the spring is restrained from longitudinal movement with respect to the channeled section 17 by tongues 63 struck outwardly from the outer spring leaf and engaged between a closely spaced pair of the ears 62. In each case, also, the inner leaf of the spring has an inwardly struck tongue 64 which is engaged by the stop or abutment 61 at the inner end of the sliding bar, to limit outward movement of the bar.

The inner leaf or section of the laminated spring bears against the bottom edges of the bar sides 65 for a substantial portion of the length of the bar 18, thereby pressing the bar against the top or outer wall of the arm section 17 and frictionally holding it in adjusted position; and, in the form shown in Fig. 7 (corresponding to that disclosed in my aforesaid copending application), the edges of the bar sides 65 are notched at 66 and the free end 67 of the inner spring leaf 68 is bent inwardly to engage in corresponding notches of the respective sides, thereby releasibly to lock the bar in any one of several adjustable positions. The leaf 68 is held against longitudinal movement relative to the outer leaf 69 by outwardly struck tongues 70 which engage in the recesses formed in leaf 69 by striking out the tongues 63.

In the preferred form of Figs. 1 to 6, the folding of the flat spring upon itself to provide the inner and outer leaves 78 and 79, respectively, tends to produce an outward bow 80 near the fold so that the folded end 81 presses snugly against the bar sides 65 adjacent the open end of the channeled arm section 17 (Fig. 5), thereby preventing any looseness or chattering at that point. The spring member 78, 79 is tensioned toward operative position by inserting a saddle member or support 82 within the chanel of section 17 and beneath the spring near its inner end (Fig. 2), the sides 83 of the saddle being substantially wider than the sides 65 of the bar, so that the adjacent pairs of retaining ears 62' constitute a fulcrum tending to force the outer portion of the spring against the bar; and the support 82 thus holds the inner end portion of said spring member in stationary position.

The free end of the clock spring 21 is arranged to react against a portion of the outer arm section 17 to urge its outer end toward the windshield, as aforesaid. As shown in Fig. 2, the spring end 86 bears against the end of a screw 87 threading in an opening in the stationary inner end of the spring leaf 78, so that the effective tension of the coiled spring may be varied by adjusting said screw. It will be understood that the said end portion of the spring leaf 78 is substantially inflexible by reason of the supporting saddle member 83, and does not yield under the action of the clock spring 21. It will be apparent on the other hand that the clock spring will yield so that the outer section 17 at the arm may be swung outwardly and upwardly with respect to the windshield, on the pivot 20; and it will be observed that the spring-tensioned inner movement of arm section 17 is limited by its engagement with the stop fingers 34 which project at the outer end of the inner section 14 (Fig. 2).

The terminal 19 at the free end of the bar 18 is preferably pivoted to the bar as by a rivet 91 and has a broad, fan-shaped portion bearing on the bar and formed with a slot 92 (Fig. 6) receiving a set screw 93, so that the terminal may be turned on the pivot 91 and fastened in adjusted angular position, as described and claimed in my aforesaid copending application. The terminal may also have a hook 94 secured by a rivet 95, for attaching the arm to certain types of wiper blade clips.

In the modified arrangement of Fig. 13, the adjusting screw 87 threads in a nut 97 having locating studs 98 fitting in openings 99 of inwardly bent ears 100 formed on the sides 48 of the outer arm section 17, instead of in the inner end of the member 78 as shown in Fig. 2. It will be understood, of course, that the adjusting means bearing on the end 86 of the clock spring may take various forms, and may react on optional stationary parts of the outer section 17.

The further modification shown in Fig. 14 provides means for releasably supporting the outer arm section in elevated position away from the windshield. To this end, the side walls of the cap or closure 16' are formed with outward extensions 102 disposed adjacent the respective side walls 48 of the outer section 18 (one pair of complemental walls being shown in the drawings) and having sockets or openings 103 therein; and the side walls 48 are provided with inwardly punched detents or studs 104 which engage in the openings 103 when said section is manually lifted to elevated position as indicated by the dotted line position of Fig. 14. In such case, the cap 16' is firmly secured to the inner section 31 by a screw 105 threading in the bridge member 33.

An articulated wiper arm of the character herein described is relatively simple and economical to manufacture and assemble, easy to apply to the usual motor shaft and wiper blade, and durable and efficient in use. The spring members and other operative parts of the device are protected and normally concealed by cover or cap 16 and the sides of the channeled outer section 17; and the arm as a whole is attractive in appearance without sacrifice of operative utility.

It will be understood that the term "clock spring" as used herein and in the following claims is intended to designate a strip of flat spring steel having appreciable width, coiled in a spiral, as shown in Fig. 2, as distinguished from the leaf spring members 78 and 79 and from the ordinary coiled spring made of round wire and rolled in a helix. It will be evident that the usual coiled wire spring would not serve the purposes and could not be supported and adjusted in the manner herein described.

I claim:

1. In an articulated wiper arm having pivotally connected inner and outer sections, a sleeve disposed at the axis of the pivotal connection, means independent of the pivot for securing the sleeve to the inner section so that relative movement between said parts is prevented, a spiral spring surrounding the sleeve, means anchoring the inner end of the spring to the sleeve, the outer end of said spring reacting against a portion of the outer section and tending to move the free end of said section toward operative position.

2. In an articulated wiper arm having pivotally connected inner and outer sections, a sleeve surrounding the pivot, the inner section having sides engaging the ends of the sleeve and said sides and ends having mutually interfitting elements for preventing rotation of the sleeve relative to said inner section, a clock spring surrounding the sleeve, and means anchoring the inner end of the spring to the sleeve, the outer end of said spring reacting against a portion of the outer section and tending to move the free end of said section toward operative position, the inner section having a projection engaged by the outer section to limit said movement.

3. In an articulated wiper arm having pivotally connected inner and outer sections, a clock spring surrounding the pivot, and means anchoring the inner end of the spring to the inner section at the pivot, the outer end of said spring reacting against a portion of the outer section and tending to move the free end of said section toward operative position, and means engaging the outer end of said spring for adjusting the effective tension thereof.

4. In an articulated wiper arm having pivotally connected inner and outer sections, a clock spring surrounding the pivotal connection, means anchoring the inner end of the spring to the inner section at the pivot, the outer section having a stationary part, and adjusting means engaging said stationary part and engaging the outer end of said spring to vary its effective tension, said spring serving to move the free end of the outer section toward operative position.

5. In an articulated wiper arm having pivotally connected inner and outer sections, a spiral spring surrounding the pivotal connection, the inner section having spaced sides formed with opposed polygonal openings, and a sleeve fitting over the pivot and having end portions of polygonal cross-section engaged in said openings, the inner end of said spring fixedly engaging said sleeve between said sides, and the outer end of said spring bearing against a portion of the outer section and tending to move the free end of said section toward operative position.

6. In an articulated wiper arm, an inner section pivotally connected at one end to an outer section of the arm and adapted to be mounted at its opposite end upon a motor shaft, said inner section comprising a single strip of metal shaped to provide a pair of side members and an integral bridge member connecting said sides and holding them in spaced relation, the inner ends of said sides being shaped to provide a sleeve for receiving a bushing, and said ends having interlocking connections preventing their separation, means engaging the respective sides intermediate the sleeve portion and the bridge member for clamping the sleeve on said bushing, said sides having opposed openings adjacent their outer ends, and a pivot extending through said openings for pivotally connecting the outer arm section to said inner arm section.

7. In an articulated wiper arm, an inner section pivotally connected at one end to an outer section of the arm and adapted to be mounted at its opposite end upon a motor shaft, said inner section comprising a single strip of metal shaped to provide a pair of side members and an integral bridge member connecting said sides and holding them in spaced relation, the inner ends of said sides being shaped to provide a sleeve for receiving a bushing and said ends having interlocking connections preventing their separation, means engaging the respective sides intermediate the sleeve portion and the bridge member for clamping the sleeve on said bushing, said sides having opposed polygonal openings adjacent their outer ends, and a pivot extending through said openings for pivotally connecting the outer arm section to said inner arm section, a sleeve surrounding said pivot and having polygonal ends engaged in said openings so that said sleeve is held against rotation relative to said sides, and a clock spring surrounding the pivot and having its inner end fixed to said sleeve, the outer end of said spring bearing against a portion of the outer arm section and tending to move it toward operative position.

8. In an articulated wiper arm, an inner section pivotally connected at one end to an outer section of the arm and adapted to be mounted at its opposite end upon a motor shaft, said inner section comprising a single strip of metal shaped to provide a pair of side members and an integral bridge member connecting said sides and holding them in spaced relation, the inner ends of said sides being shaped to provide a sleeve for receiving a bushing and said ends having interlocking connections preventing their separation, means engaging the respective sides intermediate the sleeve portion and the bridge member for clamping the sleeve on said bushing, said sides having opposed polygonal openings adjacent their outer ends, and a pivot extending through said openings for pivotally connecting the outer arm section to said inner arm section, a sleeve surrounding said pivot and having polygonal ends engaged in said openings so that said sleeve is held against rotation relative to said sides, and a clock spring surrounding the pivot and having its inner end fixed to said sleeve, the outer end of said spring reacting against a portion of the outer arm section and tending to move it toward operative position, the outer ends of the sides of the inner section having projections engageable with the outer section to limit said movement.

9. In an articulated wiper arm, an inner section pivotally connected at one end to an outer section of the arm and adapted to be mounted at its opposite end upon a motor shaft, said inner section comprising a single strip of metal shaped to provide a pair of side members and an integral bridge member connecting said sides and holding them in spaced relation, the inner ends of said sides being shaped to provide a sleeve for receiving a bushing, and said ends having interlocking connections preventing their separation, means engaging the respective sides intermediate the sleeve portion and the bridge member for clamping the sleeve on said bushing, said sides having opposed openings adjacent their outer ends, a pivot extending through said openings for pivotally connecting the outer arm section to said inner arm section, and a casing hinged at said pivot and adapted to cover said inner section, the respective sides of said inner section having recesses therein, and the casing having sides formed with detents engageable in said recesses releasably to lock the casing in closed position.

10. In an articulated wiper arm having pivotally connected inner and outer sections, spring means surrounding the pivot and reacting on the respective sections to move the free end of the outer section toward operative position, a cap normally enclosing the inner section and hinged to the arm at said pivot, the cap and the outer section having side walls disposed adjacent each other, and the complemental walls of said parts having stud and socket elements mutually engageable when the outer section is moved to elevated position away from the windshield, releasibly to hold said section in said position.

MAX ZAIGER.